United States Patent
Lee et al.

(10) Patent No.: US 9,674,867 B2
(45) Date of Patent: Jun. 6, 2017

(54) METHOD FOR CANCELING SCHEDULING REQUESTS TRIGGERED BY A SIDELINK BUFFER STATUS REPORT IN A D2D COMMUNICATION SYSTEM AND DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/835,283

(22) Filed: Aug. 25, 2015

(65) Prior Publication Data

US 2016/0128094 A1 May 5, 2016

Related U.S. Application Data

(60) Provisional application No. 62/075,806, filed on Nov. 5, 2014.

(51) Int. Cl.
H04W 72/14 (2009.01)
H04W 28/06 (2009.01)

(52) U.S. Cl.
CPC .......... *H04W 72/14* (2013.01); *H04W 28/065* (2013.01)

(58) Field of Classification Search
CPC .......................... H04W 72/14; H04W 28/065
See application file for complete search history.

(56) References Cited

U.S. PATENT DOCUMENTS

| | | | |
|---|---|---|---|
| 2010/0284354 A1* | 11/2010 | Ostergaard | H04W 72/1284 370/329 |
| 2012/0294269 A1* | 11/2012 | Yamada | H04L 1/1864 370/329 |
| 2012/0307767 A1 | 12/2012 | Yamada et al. | |
| 2013/0322413 A1 | 12/2013 | Pelletier et al. | |
| 2014/0023008 A1 | 1/2014 | Ahn et al. | |

FOREIGN PATENT DOCUMENTS

WO 2013/191353 12/2013

OTHER PUBLICATIONS

3rd Generation Partnership Project (3GPP), "Technical Specification Group Radio Access Network; Evolved Universal Terrestrial Radio Access (E-UTRA); Medium Access Control (MAC) protocol specification (Release 12)," 3GPP TS 36.321 V12.3.0, Sep. 2014, 59 pages.
PCT International Application No. PCT/KR2015/007952, Written Opinion of the International Searching Authority dated Nov. 26, 2015, 9 pages.

* cited by examiner

*Primary Examiner* — Mohammad Anwar
(74) *Attorney, Agent, or Firm* — Lee Hong Degerman Kang Waimey

(57) ABSTRACT

The present invention relates to a wireless communication system. More specifically, the present invention relates to a method and a device for canceling scheduling requests triggered by a sidelink buffer status report in a D2D communication system, the method comprising: receiving an uplink grant while one or more Scheduling Requests (SRs) are pending, wherein all of the one or more SRs are triggered by sidelink Buffer Status Report (BSR); generating a MAC (Medium Access Control) PDU (Protocol Data Unit); and canceling the all of the one or more pending SRs if the MAC PDU includes a sidelink BSR MAC CE (Medium Access Control Control Element).

12 Claims, 15 Drawing Sheets

FIG. 3
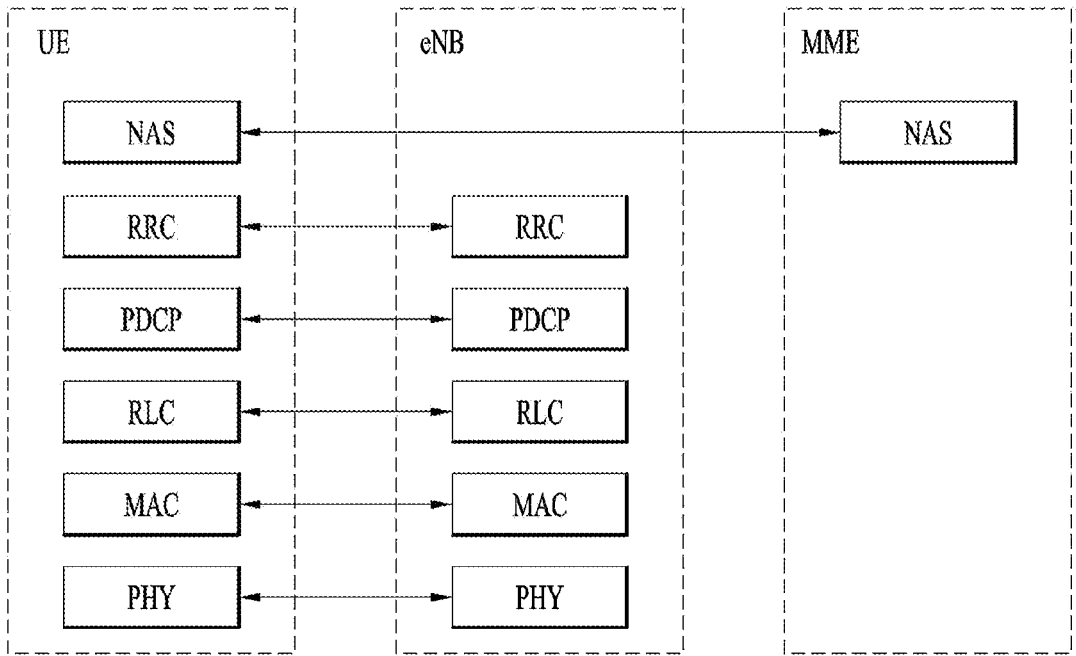
(a) Control-Plane Protocol Stack
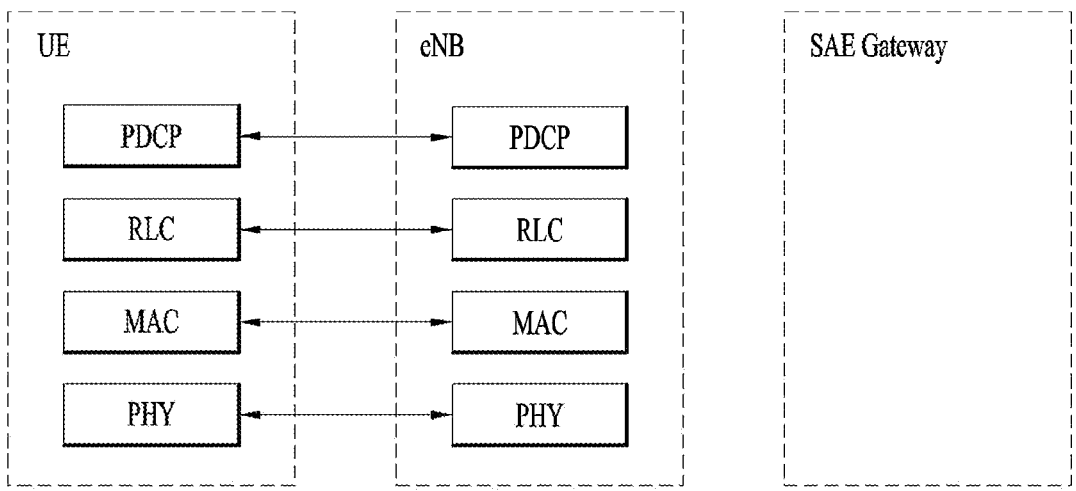
(b) User-Plane Protocol Stack

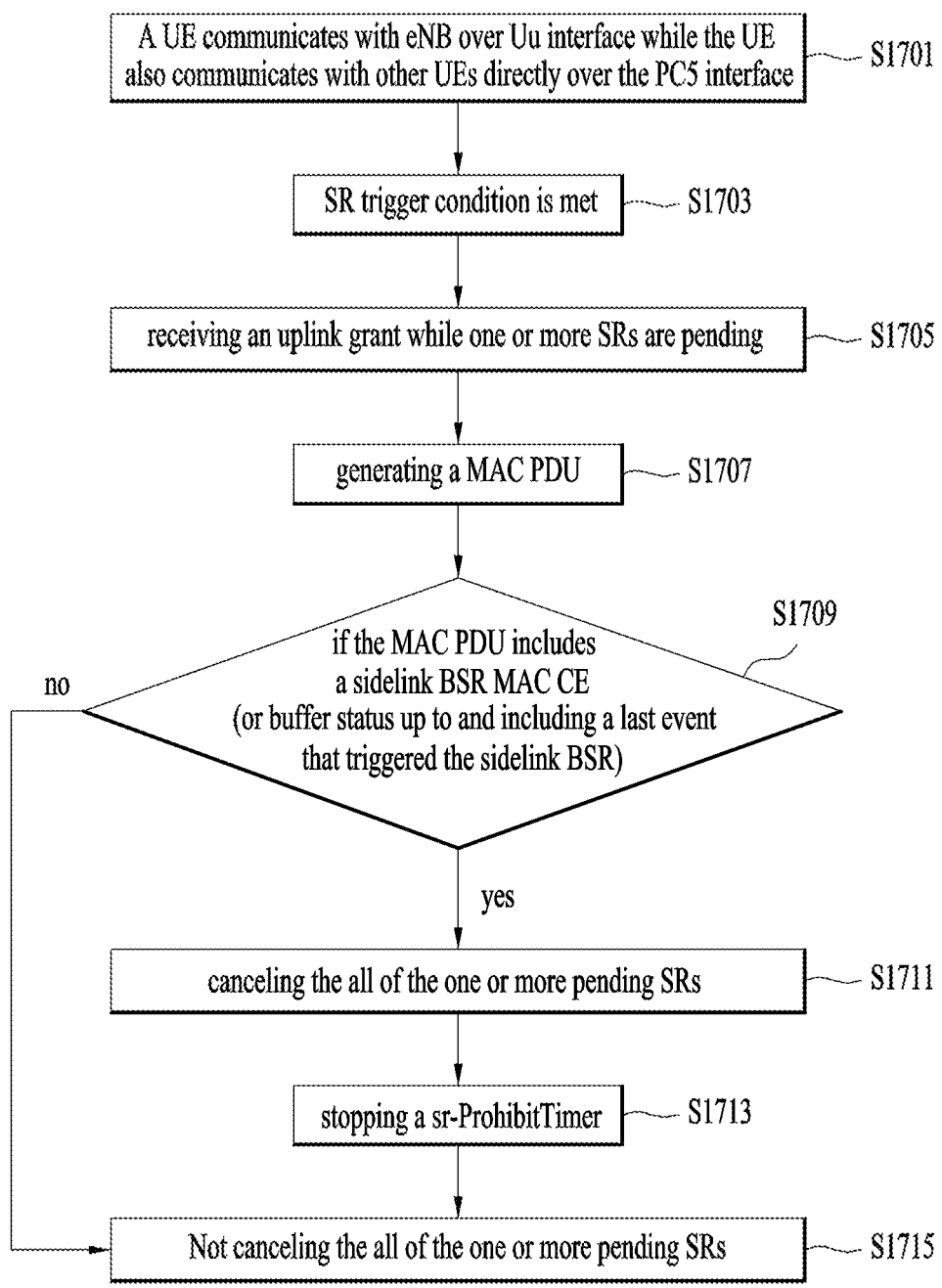

METHOD FOR CANCELING SCHEDULING REQUESTS TRIGGERED BY A SIDELINK BUFFER STATUS REPORT IN A D2D COMMUNICATION SYSTEM AND DEVICE THEREFOR

CROSS-REFERENCE TO RELATED APPLICATIONS

Pursuant to 35 U.S.C. §119(e), this application claims the benefit of the U.S. Patent Application No. 62/075,806, filed on Nov. 5, 2014, the contents of which are all hereby incorporated by reference herein in their entirety.

BACKGROUND OF THE INVENTION

Field of the Invention

The present invention relates to a wireless communication system and, more particularly, to a method for canceling scheduling requests triggered by a sidelink buffer status report in a D2D (Device to Device) communication system and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase throughput of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

The D2D communication technologies such as infrared communication, ZigBee, radio frequency identification (RFID) and near field communications (NFC) based on the RFID have been already used. However, since these technologies support communication only of a specific object within a limited distance (about 1 m), it is difficult for the technologies to be regarded as the D2D communication technologies strictly.

Although the D2D communication has been described as above, details of a method for transmitting data from a plurality of D2D user equipments with the same resource have not been suggested.

SUMMARY OF THE INVENTION

The object of the present invention can be achieved by providing a method for operating by an apparatus in wireless communication system, the method comprising; receiving an uplink grant while one or more Scheduling Requests (SRs) are pending, wherein all of the one or more SRs are triggered by sidelink Buffer Status Report (BSR); generating a MAC (Medium Access Control) PDU (Protocol Data Unit); and canceling the all of the one or more pending SRs if the MAC PDU includes a sidelink BSR MAC CE (Medium Access Control Control Element).

In another aspect of the present invention provided herein is an UE operating in wireless communication system, the UE comprising: a RF module; and processor configured to control the RF module, wherein the processor is configured to receive an uplink grant while one or more Scheduling Requests (SRs) are pending, wherein all of the one or more SRs are triggered by sidelink Buffer Status Report (BSR), to generate a MAC (Medium Access Control) PDU (Protocol Data Unit), and to cancel the all of the one or more pending SRs if the MAC PDU includes a sidelink BSR MAC CE (Medium Access Control Control Element).

Preferably, the sidelink BSR MAC CE contains buffer status up to and including a last event that triggered the sidelink BSR Preferably, the method further comprises: stopping a sr-ProhibitTimer, if the MAC PDU includes a sidelink BSR MAC CE.

Preferably, if the sidelink BSR MAC CE doesn't contain the buffer status up to and including the last event that triggered the sidelink BSR, the UE does not cancel any pending SRs triggered by the sidelink BSR.

Preferably, if the MAC PDU doesn't include a sidelink BSR MAC CE, the UE does not cancel any pending SRs triggered by the sidelink BSR.

Preferably, if the MAC PDU includes a sidelink BSR MAC CE not containing buffer status up to and including a last event that triggered the sidelink BSR, the UE does not cancel any pending SRs triggered by the sidelink BSR.

Preferably, the UE cancels all triggered sidelink BSRs.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3rd generation partnership project (3GPP) radio access network standard;

FIG. 17 is a diagram for canceling scheduling requests triggered by a sidelink buffer status report in a D2D communication system according to embodiments of the present invention.

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
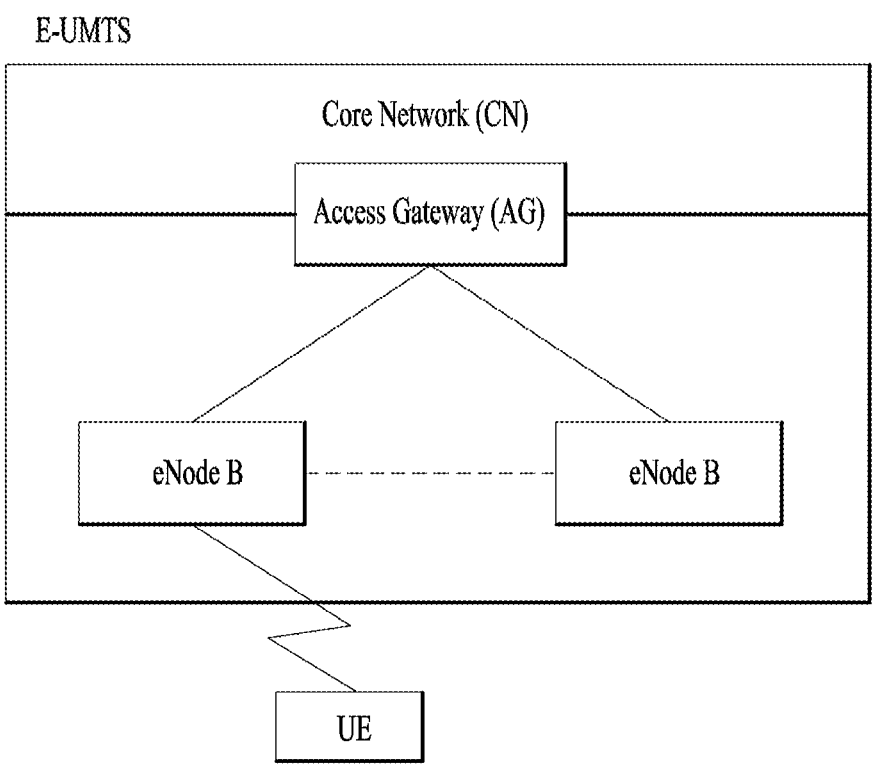
FIG. 1 is a diagram showing a network structure of an Evolved Universal Mobile Telecommunications System (E-UMTS) as an example of a wireless communication system.
Figure 2A:
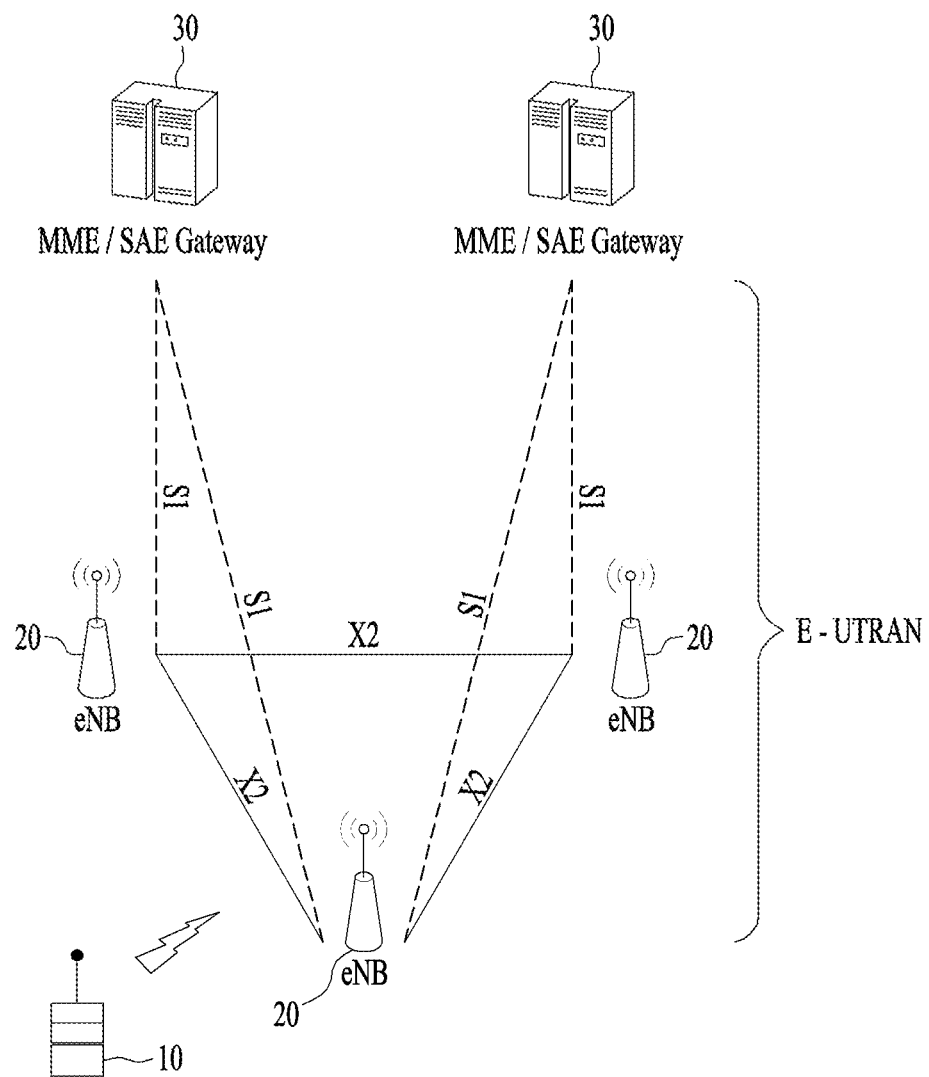
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
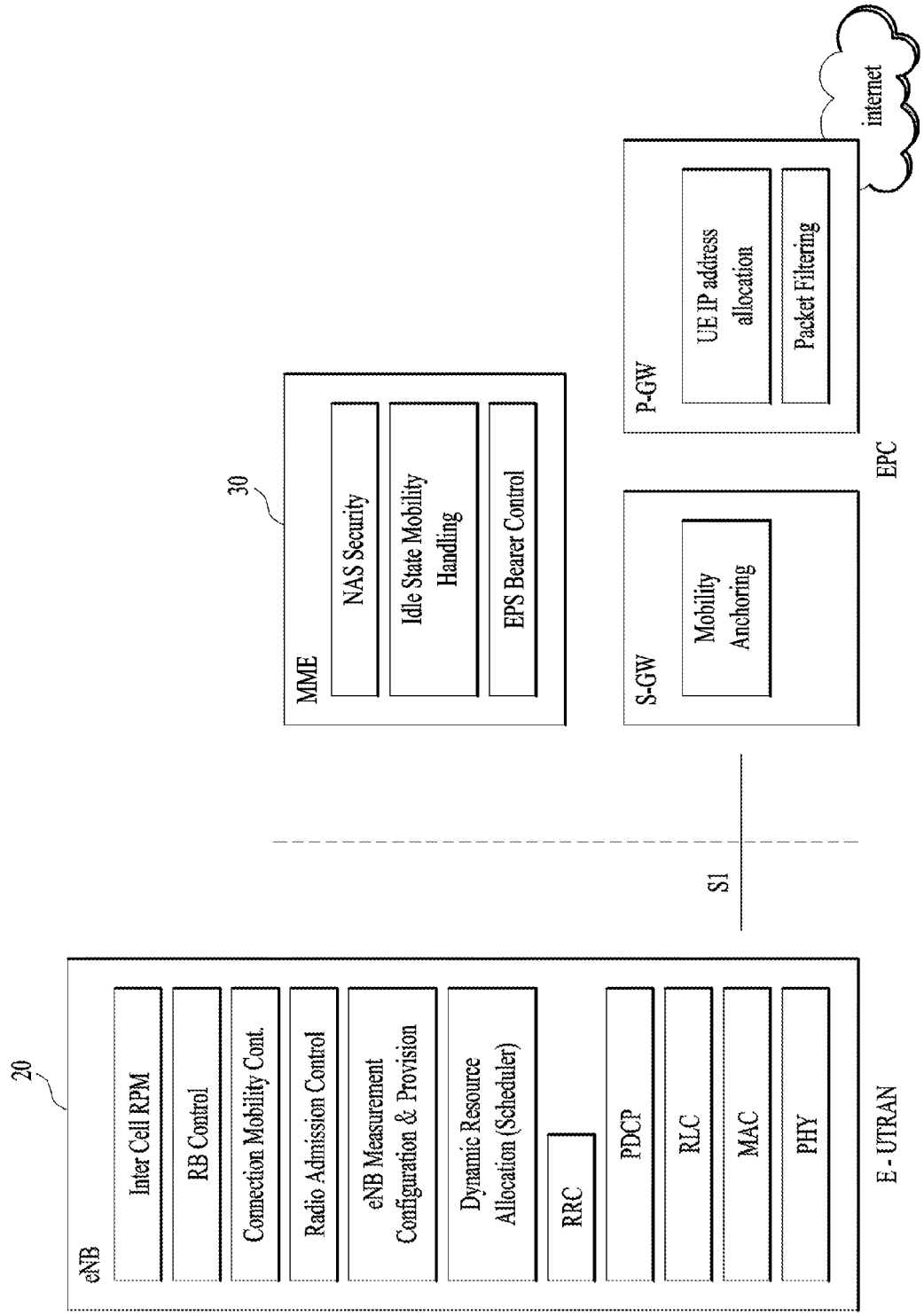
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
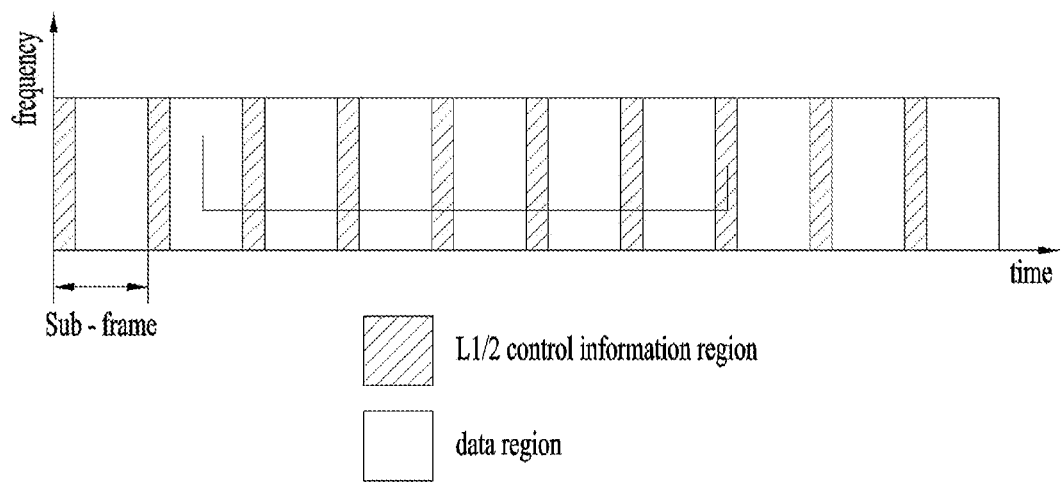
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
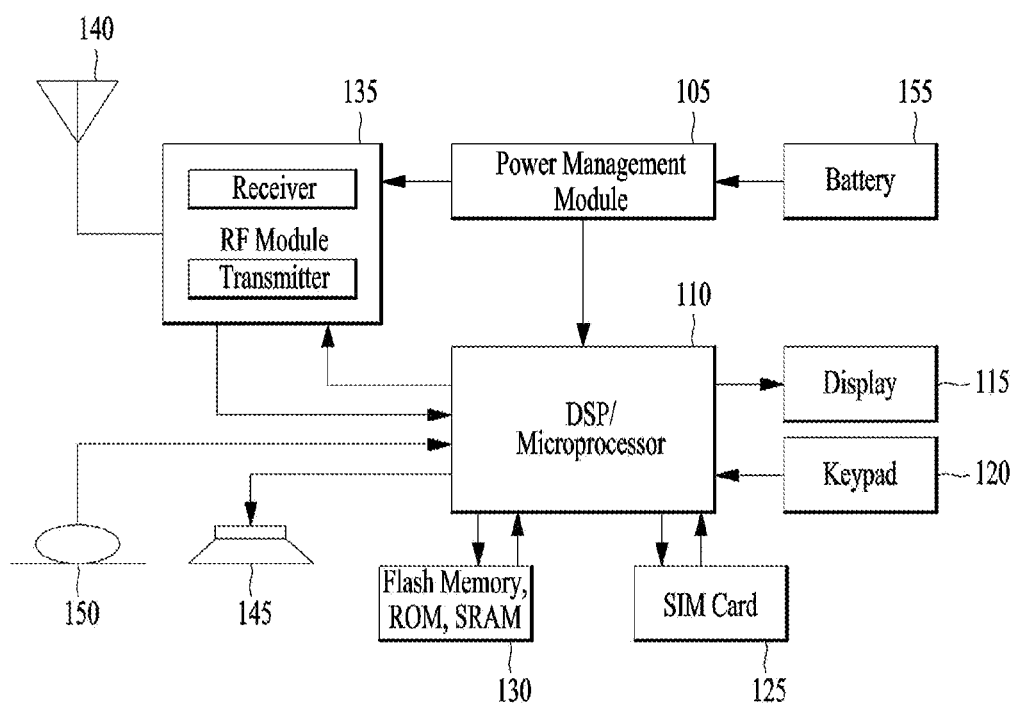
FIG. 5 is a block diagram of a communication apparatus according to an embodiment of the present invention

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals)

Figure 6:
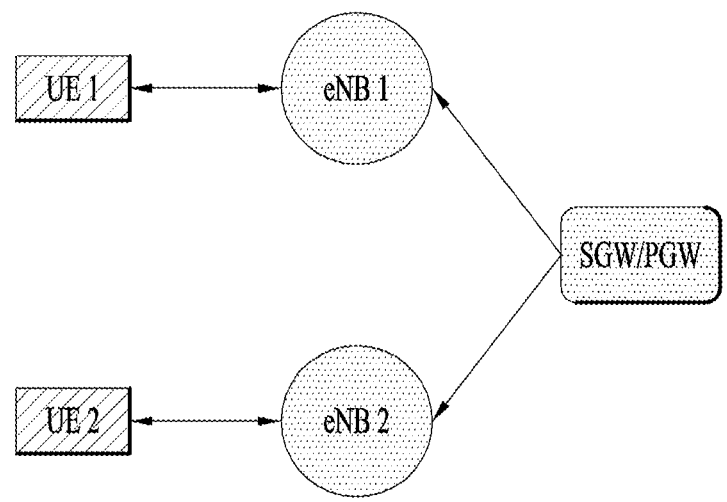
FIG. 6 is an example of default data path for a normal communication.

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

Figure 7:
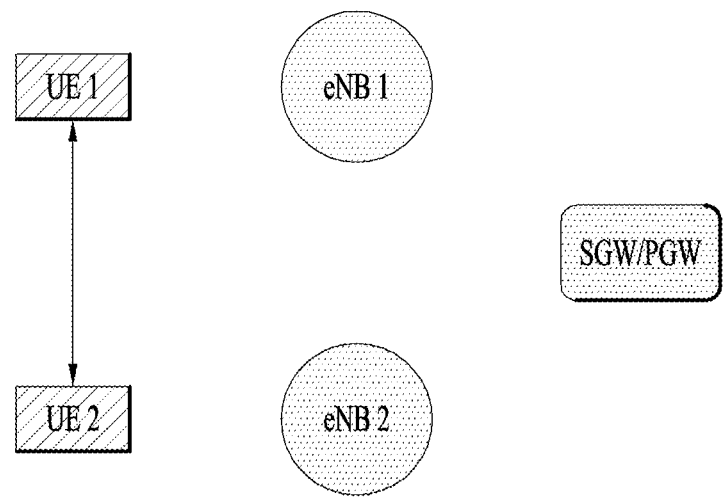
FIGS. 7 and 8 are examples of data path scenarios for a proximity communication.
Figure 8:
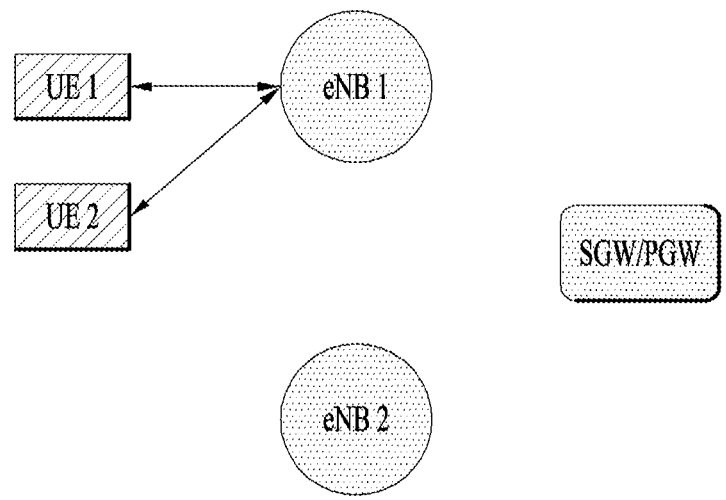

FIGS. 7 and 8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

Figure 9:
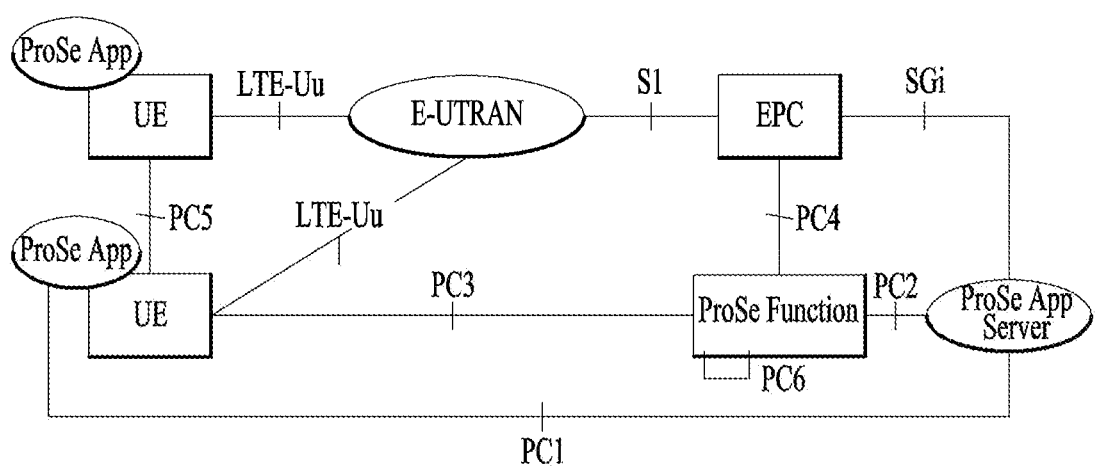
FIG. 9 is a conceptual diagram illustrating for a non-roaming reference architecture.

FIG. 9 is a conceptual diagram illustrating for a non-roaming reference architecture.

PC1 to PC 5 represent interfaces. PC1 is a reference point between a ProSe application in a UE and a ProSe App server. It is used to define application level signaling requirements. PC 2 is a reference point between the ProSe App Server and the ProSe Function. It is used to define the interaction between ProSe App Server and ProSe functionality provided by the 3GPP EPS via ProSe Function. One example may be for application data updates for a ProSe database in the ProSe Function. Another example may be data for use by ProSe App Server in interworking between 3GPP functionality and application data, e.g. name translation. PC3 is a reference point between the UE and ProSe Function. It is used to define the interaction between UE and ProSe Function. An example may be to use for configuration for ProSe discovery and communication. PC4 is a reference point between the EPC and ProSe Function. It is used to define the interaction between EPC and ProSe Function. Possible use cases may be when setting up a one-to-one communication path between UEs or when validating ProSe services (authorization) for session management or mobility management in real time.

PC5 is a reference point between UE to UE used for control and user plane for discovery and communication, for relay and one-to-one communication (between UEs directly and between UEs over LTE-Uu). Lastly, PC6 is a reference point may be used for functions such as ProSe Discovery between users subscribed to different PLMNs.

EPC (Evolved Packet Core) includes entities such as MME, S-GW, P-GW, PCRF, HSS etc. The EPC here represents the E-UTRAN Core Network architecture. Interfaces inside the EPC may also be impacted albeit they are not explicitly shown in FIG. 9.

Application servers, which are users of the ProSe capability for building the application functionality, e.g. in the Public Safety cases they can be specific agencies (PSAP) or in the commercial cases social media. These applications are defined outside the 3GPP architecture but there may be reference points towards 3GPP entities. The Application server can communicate towards an application in the UE.

Applications in the UE use the ProSe capability for building the application functionality. Example may be for communication between members of Public Safety groups or for social media application that requests to find buddies in proximity. The ProSe Function in the network (as part of EPS) defined by 3GPP has a reference point towards the ProSe App Server, towards the EPC and the UE.

The functionality may include but not restricted to e.g.:
Interworking via a reference point towards the 3rd party Applications
Authorization and configuration of the UE for discovery and Direct communication
Enable the functionality of the EPC level ProSe discovery
ProSe related new subscriber data and/handling of data storage; also handling of ProSe identities;
Security related functionality
Provide Control towards the EPC for policy related functionality
Provide functionality for charging (via or outside of EPC, e.g. offline charging)

Especially, the following identities are used for ProSe Direct Communication:
Source Layer-2 ID identifies a sender of a D2D packet at PC5 interface. The Source Layer-2 ID is used for identification of the receiver RLC UM entity;
Destination Layer-2 ID identifies a target of the D2D packet at PC5 interface. The Destination Layer-2 ID is used for filtering of packets at the MAC layer. The Destination Layer-2 ID may be a broadcast, groupcast or unicast identifier; and
SA L1 ID identifier in Scheduling Assignment (SA) at PC5 interface. SA L1 ID is used for filtering of packets at the physical layer. The SA L1 ID may be a broadcast, groupcast or unicast identifier.

No Access Stratum signaling is required for group formation and to configure Source Layer-2 ID and Destination Layer-2 ID in the UE. This information is provided by higher layers.

In case of groupcast and unicast, the MAC layer will convert the higher layer ProSe ID (i.e. ProSe Layer-2 Group ID and ProSe UE ID) identifying the target (Group, UE) into two bit strings of which one can be forwarded to the physical layer and used as SA L1 ID whereas the other is used as Destination Layer-2 ID. For broadcast, L2 indicates to L1 that it is a broadcast transmission using a pre-defined SA L1 ID in the same format as for group- and unicast.

Figure 10:
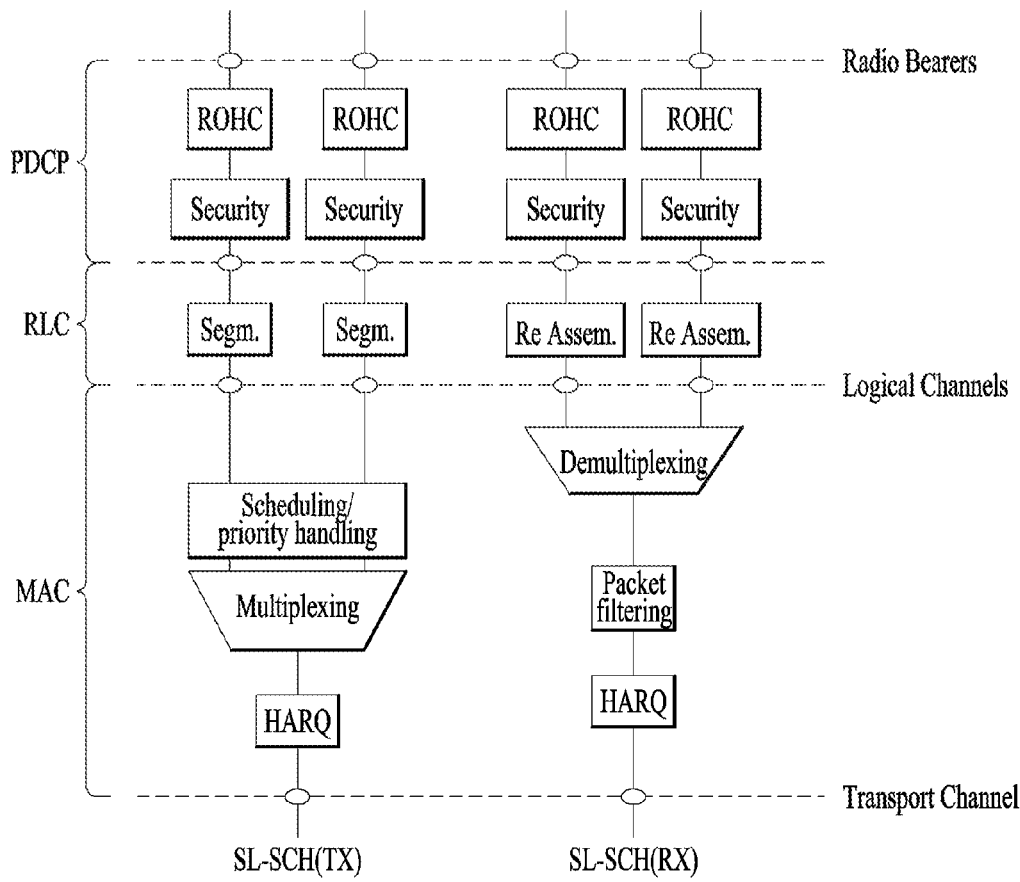
FIG. 10 is a conceptual diagram illustrating for a Layer 2 Structure for Sidelink.

FIG. 10 is a conceptual diagram illustrating for a Layer 2 structure for Sidelink.

The Sidelink is UE to UE interface for ProSe direct communication and ProSe Direct Discovery. Corresponds to the PC5 interface. The Sidelink comprises ProSe Direct Discovery and ProSe Direct Communication between UEs. The Sidelink uses uplink resources and physical channel structure similar to uplink transmissions. However, some changes, noted below, are made to the physical channels.

E-UTRA defines two MAC entities; one in the UE and one in the E-UTRAN. These MAC entities handle the following transport channels additionally, i) sidelink broadcast channel (SL-BCH), ii) sidelink discovery channel (SL-DCH) and iii) sidelink shared channel (SL-SCH).

Basic transmission scheme: the Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Physical-layer processing: the Sidelink physical layer processing of transport channels differs from UL transmission in the following steps:
i) Scrambling: for PSDCH and PSCCH, the scrambling is not UE-specific;
ii) Modulation: 64 QAM is not supported for Sidelink.

Physical Sidelink control channel: PSCCH is mapped to the Sidelink control resources. PSCCH indicates resource and other transmission parameters used by a UE for PSSCH.

Sidelink reference signals: for PSDCH, PSCCH and PSSCH demodulation, reference signals similar to uplink demodulation reference signals are transmitted in the 4th symbol of the slot in normal CP and in the 3rd symbol of the slot in extended cyclic prefix. The Sidelink demodulation reference signals sequence length equals the size (number of sub-carriers) of the assigned resource. For PSDCH and PSCCH, reference signals are created based on a fixed base sequence, cyclic shift and orthogonal cover code.

Physical channel procedure: for in-coverage operation, the power spectral density of the sidelink transmissions can be influenced by the eNB.

Figure 11A:
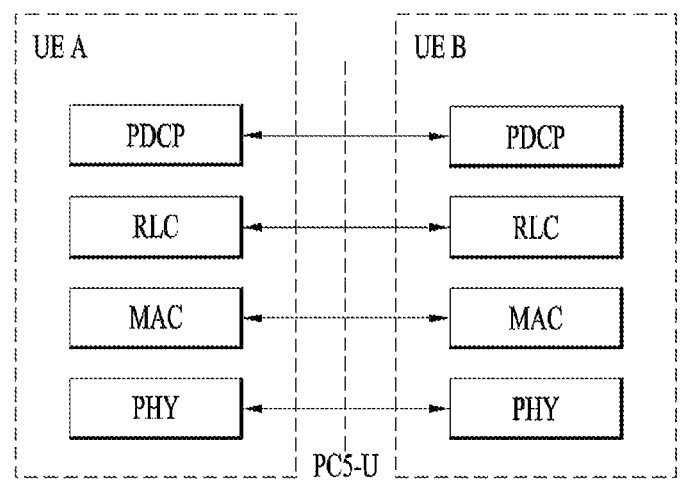
FIG. 11A is a conceptual diagram illustrating for User-Plane protocol stack for ProSe Direct Communication.
Figure 11B:
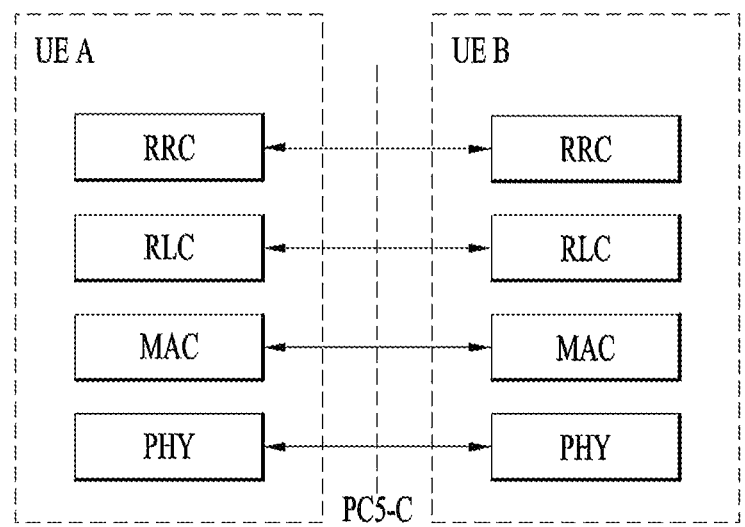
FIG. 11B is Control-Plane protocol stack for ProSe Direct Communication.

FIG. 11A is a conceptual diagram illustrating for User-Plane protocol stack for ProSe Direct Communication, and FIG. 11B is Control-Plane protocol stack for ProSe Direct Communication.

FIG. 11A shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 11A.

User plane details of ProSe Direct Communication: i) MAC sub header contains LCIDs (to differentiate multiple logical channels), ii) The MAC header comprises a Source Layer-2 ID and a Destination Layer-2 ID, iii) At MAC Multiplexing/demultiplexing, priority handling and padding are useful for ProSe Direct communication, iv) RLC UM is used for ProSe Direct communication, v) Segmentation and reassembly of RLC SDUs are performed, vi) A receiving UE needs to maintain at least one RLC UM entity per transmitting peer UE, vii) An RLC UM receiver entity does not need to be configured prior to reception of the first RLC UM data unit, and viii) U-Mode is used for header compression in PDCP for ProSe Direct Communication.

FIG. 11B shows the protocol stack for the control plane, where RRC, RLC, MAC, and PHY sublayers (terminate at the other UE) perform the functions listed for the control plane. A D2D UE does not establish and maintain a logical connection to receiving D2D UEs prior to a D2D communication.

Figure 12:
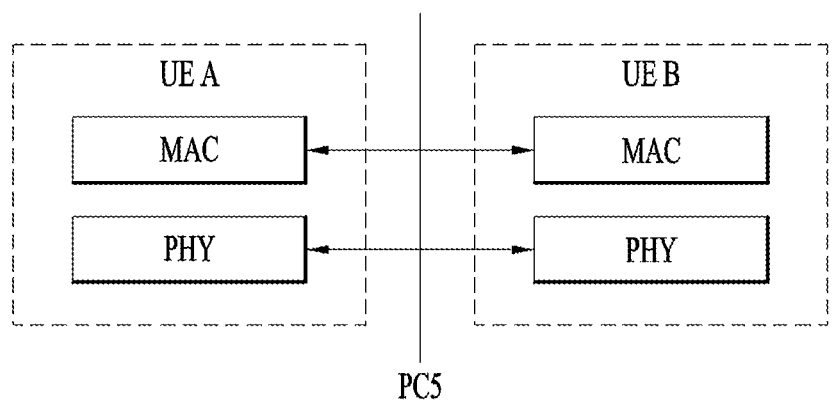
FIG. 12 is a conceptual diagram illustrating for a PC5 interface for ProSe Direct Discovery.

FIG. 12 is a conceptual diagram illustrating for a PC5 interface for ProSe Direct Discovery.

ProSe Direct Discovery is defined as the procedure used by the ProSe-enabled UE to discover other ProSe-enabled UE(s) in its proximity using E-UTRA direct radio signals via PC5.

Radio Protocol Stack (AS) for ProSe Direct Discovery is shown in FIG. 12.

The AS layer performs the following functions:

Interfaces with upper layer (ProSe Protocol): The MAC layer receives the discovery information from the upper layer (ProSe Protocol). The IP layer is not used for transmitting the discovery information.

Scheduling: The MAC layer determines the radio resource to be used for announcing the discovery information received from upper layer.

Discovery PDU generation: The MAC layer builds the MAC PDU carrying the discovery information and sends the MAC PDU to the physical layer for transmission in the determined radio resource. No MAC header is added.

There are two types of resource allocation for discovery information announcement.

Type 1: A resource allocation procedure where resources for announcing of discovery information are allocated on a non UE specific basis, further characterized by: i) The eNB provides the UE(s) with the resource pool configuration used for announcing of discovery information. The configuration may be signaled in SIB, ii) The UE autonomously selects radio resource(s) from the indicated resource pool and announce discovery information, iii) The UE can announce discovery information on a randomly selected discovery resource during each discovery period.

Type 2: A resource allocation procedure where resources for announcing of discovery information are allocated on a per UE specific basis, further characterized by: i) The UE in RRC_CONNECTED may request resource(s) for announcing of discovery information from the eNB via RRC, ii) The eNB assigns resource(s) via RRC, iii) The resources are allocated within the resource pool that is configured in UEs for monitoring.

For UEs in RRC_IDLE, the eNB may select one of the following options:

The eNB may provide a Type 1 resource pool for discovery information announcement in SIB. UEs that are authorized for Prose Direct Discovery use these resources for announcing discovery information in RRC_IDLE.

The eNB may indicate in SIB that it supports D2D but does not provide resources for discovery information announcement. UEs need to enter RRC Connected in order to request D2D resources for discovery information announcement.

For UEs in RRC_CONNECTED,

A UE authorized to perform ProSe Direct Discovery announcement indicates to the eNB that it wants to perform D2D discovery announcement.

The eNB validates whether the UE is authorized for ProSe Direct Discovery announcement using the UE context received from MME.

The eNB may configure the UE to use a Type 1 resource pool or dedicated Type 2 resources for discovery information announcement via dedicated RRC signaling (or no resource).

The resources allocated by the eNB are valid until a) the eNB de-configures the resource(s) by RRC signaling or b) the UE enters IDLE. (FFS whether resources may remain valid even in IDLE).

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

Figure 13:
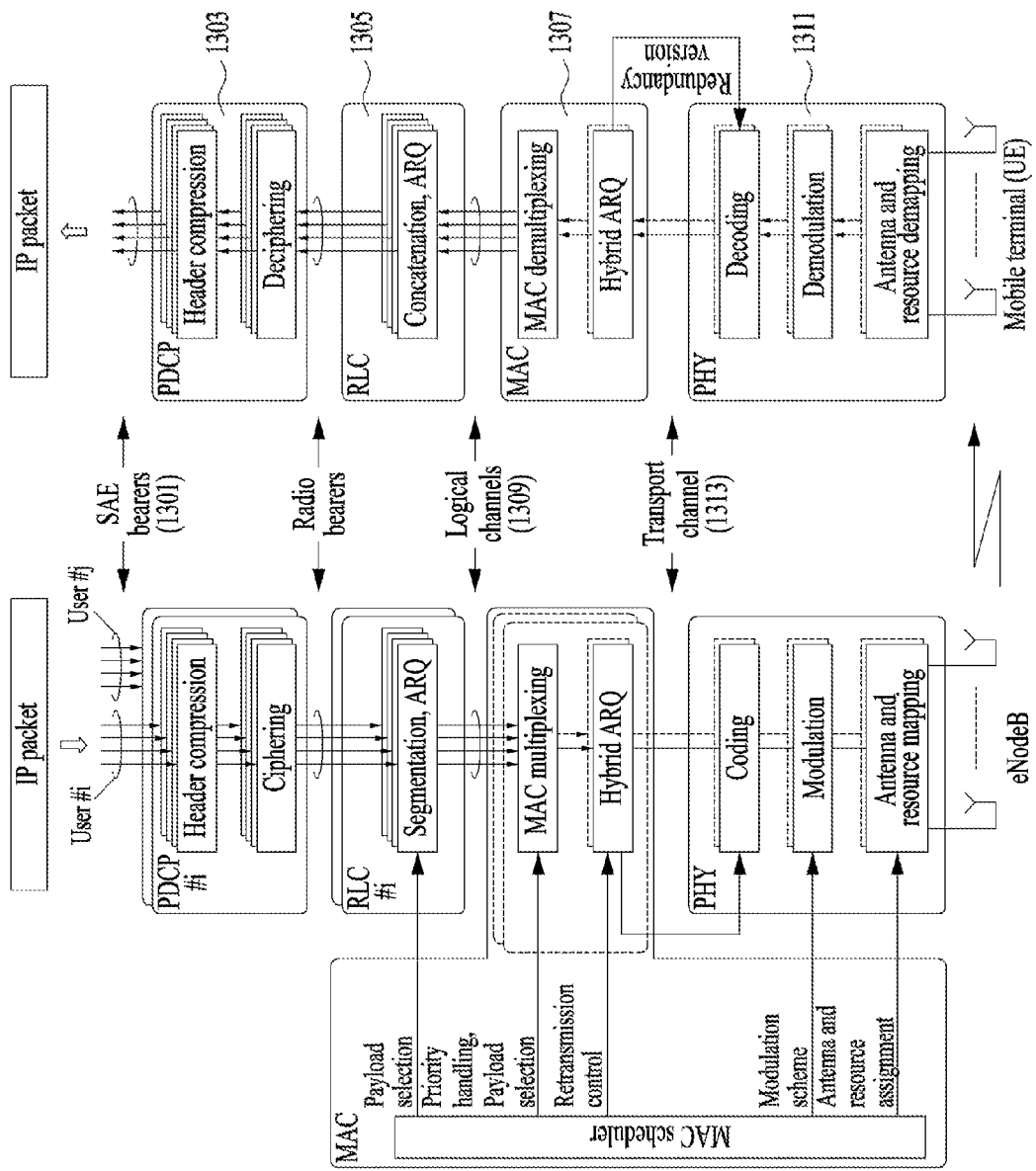
FIG. 13 is a diagram for a general overview of the LTE protocol architecture for the downlink.

FIG. 13 is a diagram for a general overview of the LTE protocol architecture for the downlink.

A general overview of the LTE protocol architecture for the downlink is illustrated in FIG. 13. Furthermore, the LTE protocol structure related to uplink transmissions is similar to the downlink structure in FIG. 13, although there are differences with respect to transport format selection and multi-antenna transmission.

Data to be transmitted in the downlink enters in the form of IP packets on one of the SAE bearers (1301). Prior to transmission over the radio interface, incoming IP packets are passed through multiple protocol entities, summarized below and described in more detail in the following sections:

Packet Data Convergence Protocol (PDCP, 1303) performs IP header compression to reduce the number of bits necessary to transmit over the radio interface. The header-compression mechanism is based on ROHC, a standardized header-compression algorithm used in WCDMA as well as several other mobile-communication standards. PDCP (1303) is also responsible for ciphering and integrity protection of the transmitted data. At the receiver side, the PDCP protocol performs the corresponding deciphering and decompression operations. There is one PDCP entity per radio bearer configured for a mobile terminal Radio Link Control (RLC, 1305) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (1305) offers services to the PDCP (1303) in the form of radio bearers. There is one RLC entity per radio bearer configured for a terminal There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

Medium Access Control (MAC, 1307) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (1307) offers services to the RLC (1305) in the form of logical channels (1309).

Physical Layer (PHY, 1311), handles coding/decoding, modulation/demodulation, multi-antenna mapping, and other typical physical layer functions. The physical layer (1311) offers services to the MAC layer (1307) in the form of transport channels (1313).

Figure 14:
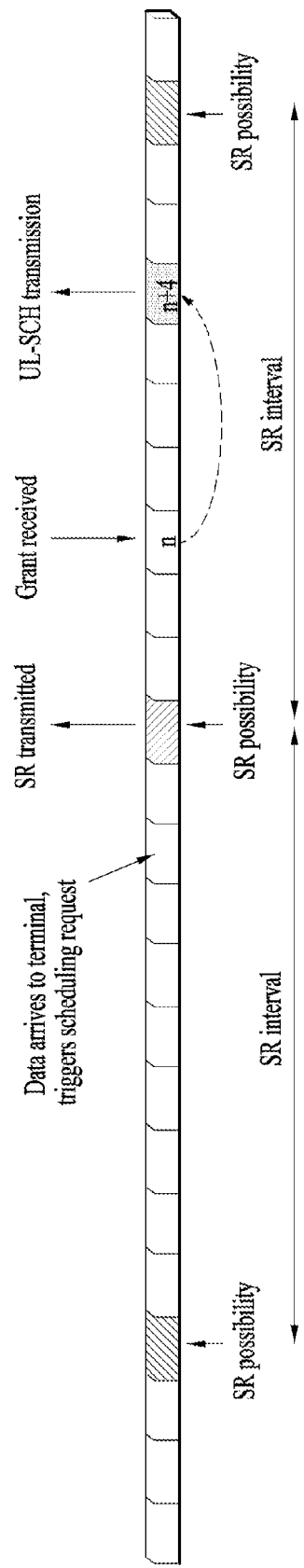
FIG. 14 is a diagram for Scheduling-request transmission.

FIG. 14 is a diagram for Scheduling-request transmission.

The scheduler needs knowledge about the amount of data awaiting transmission from the terminals to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request.

A scheduling request is a simple flag, raised by the terminal to request uplink resources from the uplink scheduler. Since the terminal requesting resources by definition has no PUSCH resource, the scheduling request is transmitted on the PUCCH. Each terminal can be assigned a dedicated PUCCH scheduling request resource, occurring every nth subframe. With a dedicated scheduling-request mechanism, there is no need to provide the identity of the terminal requesting to be scheduled as the identity of the terminal is implicitly known from the resources upon which the request is transmitted.

Figure 15:
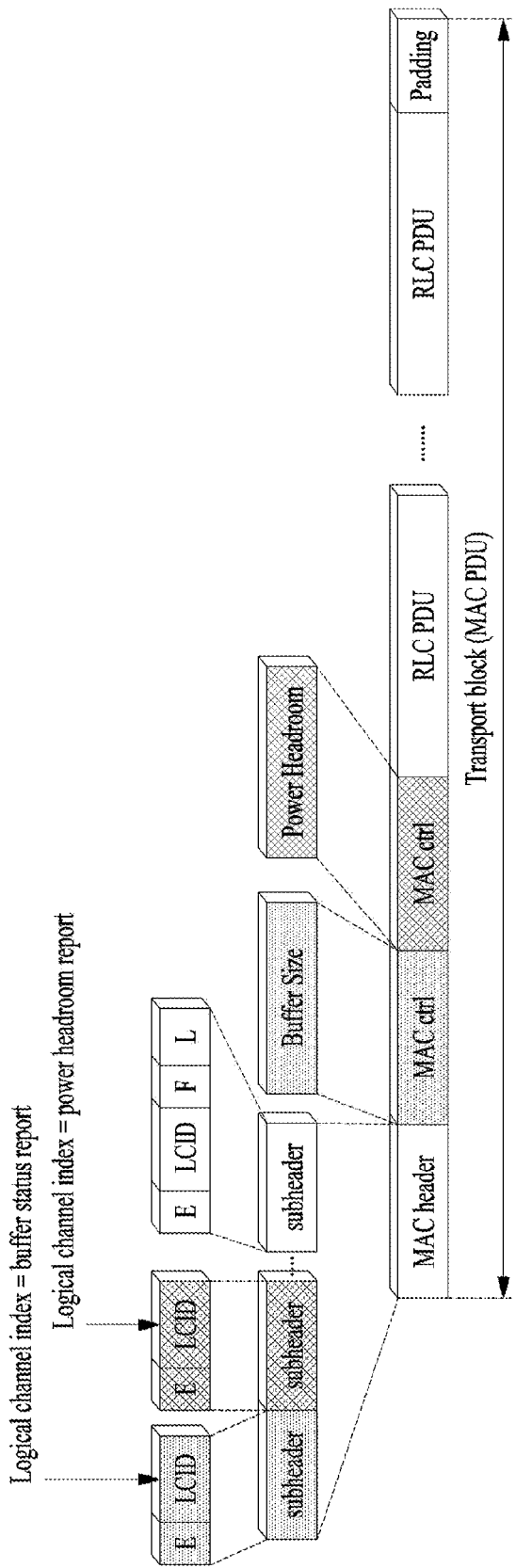
FIG. 15 is a diagram for signaling of buffer status and power-headroom reports.

When data with higher priority than already existing in the transmit buffers arrives at the terminal and the terminal has no grant and hence cannot transmit the data, the terminal transmits a scheduling request at the next possible instant, as illustrated in FIG. 15. Upon reception of the request, the scheduler can assign a grant to the terminal. If the terminal does not receive a scheduling grant until the next possible scheduling-request instant, then the scheduling request is repeated. There is only a single scheduling-request bit, irrespective of the number of uplink component carriers the terminal is capable of. In the case of carrier aggregation, the scheduling request is transmitted on the primary component carrier, in line with the general principle of PUCCH transmission on the primary component carrier only.

The use of a single bit for the scheduling request is motivated by the desire to keep the uplink overhead small, as a multi-bit scheduling request would come at a higher cost. A consequence of the single-bit scheduling request is the limited knowledge at the eNodeB about the buffer situation at the terminal when receiving such a request. Different scheduler implementations handle this differently. One possibility is to assign a small amount of resources to ensure that the terminal can exploit them efficiently without becoming power limited. Once the terminal has started to transmit on the UL-SCH, more detailed information about the buffer status and power headroom can be provided through the inband MAC control message, as discussed below. Knowledge of the service type may also be used—for example, in the case of voice the uplink resource to grant is preferably the size of a typical voice-over-IP package. The scheduler may also exploit, for example, path-loss measurements used for mobility and handover decisions to estimate the amount of resources the terminal may efficiently utilize.

An alternative to a dedicated scheduling-request mechanism would be a contention-based design. In such a design, multiple terminals share a common resource and provide their identity as part of the request. This is similar to the design of the random access.

The number of bits transmitted from a terminal as part of a request would in this case be larger, with the correspondingly larger need for resources. In contrast, the resources are shared by multiple users. Basically, contention-based designs are suitable for a situation where there are a large number of terminals in the cell and the traffic intensity, and hence the scheduling intensity, is low. In situations with higher intensities, the collision rate between different terminals simultaneously requesting resources would be too high and lead to an inefficient design.

Although the scheduling-request design for LTE relies on dedicated resources, a terminal that has not been allocated such resources obviously cannot transmit a scheduling request. Instead, terminals without scheduling-request resources configured rely on the random-access mechanism. In principle, an LTE terminal can therefore be configured to rely on a contention-based mechanism if this is advantageous in a specific deployment.

The Scheduling Request (SR) is used for requesting UL-SCH resources for new transmission. When an SR is triggered, it shall be considered as pending until it is cancelled. All pending SR(s) shall be cancelled and sr-ProhibitTimer shall be stopped when a MAC PDU is assembled and this PDU includes a BSR which contains buffer status up to (and including) the last event that triggered a BSR, or when the UL grant(s) can accommodate all pending data available for transmission.

If an SR is triggered and there is no other SR pending, the UE may set the SR_COUNTER to 0.

As long as one SR is pending, if no UL-SCH resources are available for a transmission in this TTI, the UE may initiate a Random Access procedure on a PCell and cancel all pending SRs if the UE has no valid PUCCH resource for SR configured in any TTI.

Else if the UE has a valid PUCCH resource for SR configured for this TTI and if this TTI is not part of a measurement gap and if sr-ProhibitTimer is not running, if SR_COUNTER<dsr-TransMax, the UE may increment SR_COUNTER by 1, instruct the physical layer to signal the SR on PUCCH, and start the sr-ProhibitTimer.

if SR_COUNTER≥dsr-TransMax, the UE may notify RRC to release PUCCH/SRS for all serving cells, clear any configured downlink assignments and uplink grants, and initiate a Random Access procedure on the PCell and cancel all pending SRs.

FIG. 15 is a diagram for signaling of buffer status and power-headroom reports.

Terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report, as illustrated in FIG. 15.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data awaiting transmission across all logical channels in a logical-channel group. A buffer status report represents one or all four logical-channel groups and can be triggered for the following reasons:

i) Arrival of data with higher priority than currently in the transmission buffer—that is, data in a logical-channel group with higher priority than the one currently being transmitted—as this may impact the scheduling decision.

ii) Change of serving cell, in which case a buffer-status report is useful to provide the new serving cell with information about the situation in the terminal.

iii) Periodically as controlled by a timer.

iv) Instead of padding. If the amount of padding required to match the scheduled transport block size is larger than a buffer-status report, a buffer-status report is inserted. Clearly it is better to exploit the available payload for useful scheduling information instead of padding if possible.

The Buffer Status Reporting (BSR) procedure is used to provide a serving eNB with information about the amount of data available for transmission (DAT) in the UL buffers of the UE. RRC may control BSR reporting by configuring the two timers periodicBSR-Timer and retxBSR-Timer and by, for each logical channel, optionally signaling Logical Channel Group which allocates the logical channel to an LCG (Logical Channel Group).

For the Buffer Status reporting procedure, the UE may consider all radio bearers which are not suspended and may consider radio bearers which are suspended. A Buffer Status Report (BSR) may be triggered if any of the following events occur:

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the UE has data available for transmission for any of the logical channels which belong to a LCG, in which case the BSR is referred below to as "Regular BSR";

periodicBSR-Timer expires, in which case the BSR is referred below to as "Periodic BSR".

For Regular and Periodic BSR, if more than one LCG has data available for transmission in the TTI where the BSR is transmitted, the UE may report Long BSR. If else, the UE may report Short BSR.

If the Buffer Status reporting procedure determines that at least one BSR has been triggered and not cancelled, if the UE has UL resources allocated for new transmission for this TTI, the UE may instruct the Multiplexing and Assembly procedure to generate the BSR MAC control element(s), start or restart periodicBSR-Timer except when all the generated BSRs are Truncated BSRs, and start or restart retxBSR-Timer.

Else if a Regular BSR has been triggered, if an uplink grant is not configured or the Regular BSR was not triggered due to data becoming available for transmission for a logical channel for which logical channel SR masking (logicalChannelSR-Mask) is setup by upper layers, a Scheduling Request shall be triggered.

A MAC PDU may contain at most one MAC BSR control element, even when multiple events trigger a BSR by the time a BSR can be transmitted in which case the Regular BSR and the Periodic BSR shall have precedence over the padding BSR.

The UE may restart retxBSR-Timer upon indication of a grant for transmission of new data on any UL-SCH.

All triggered BSRs may be cancelled in case UL grants in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

In summary, the BSR is triggered in any of the following situation:

i) when data arrive for a logical channel which has higher priority than the logical channels whose buffers are not empty;

ii) when data become available for the UE's buffer, which is empty;

iii) when the retxBSR-Timer expires and there is still data in the UE's buffer;

iv) when a periodicBSR-Timer expires; or v) when the remaining space in a MAC PDU can accommodate a BSR.

Figure 16A:
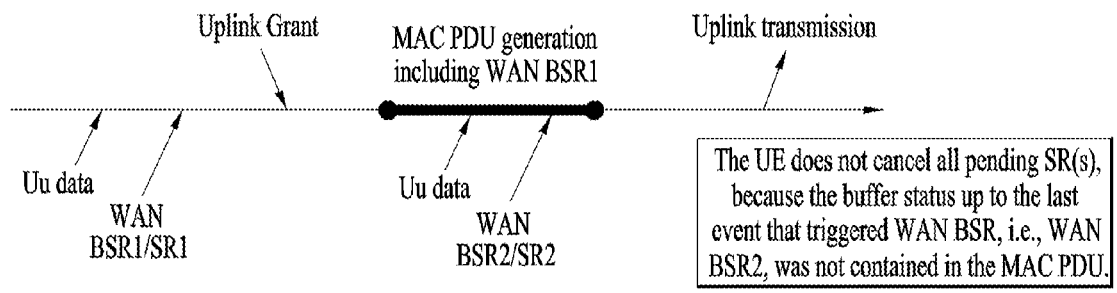
FIGS. 16A, 16B and 16C are examples of cancellation of SRs in the prior art.
Figure 16B:
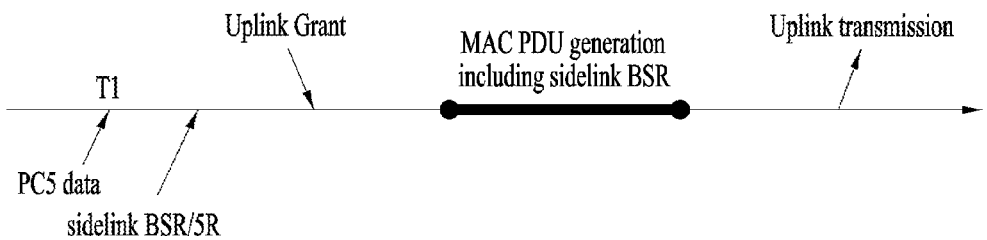
Figure 16C:
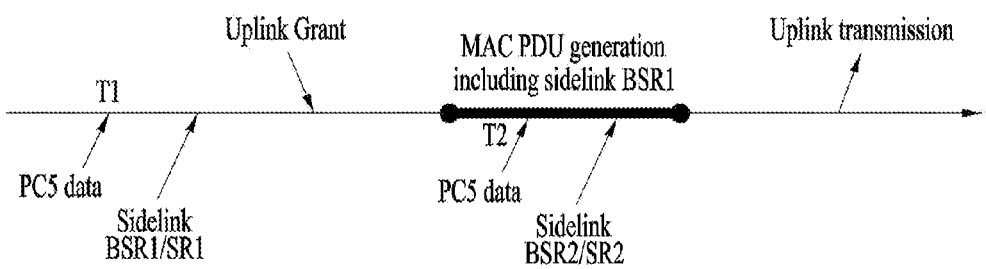

FIGS. 16A to 16C are examples of cancellation of SRs in the prior art.

In a prior art, all pending SRs are cancelled when a MAC PDU includes a WAN BSR which contains buffer status up to the last event that triggered a WAN BSR.

For example, assume the UE transmits an SR triggered due to, e.g., BSR1, and receives an uplink grant according to which the UE performs uplink transmission 4 ms after reception of the uplink grant. During a MAC PDU including WAN BSR is being generated, a new SR is triggered by, e.g., BSR2, and the UE considers that the SR is pending. Then, the BSR2 might not be included in the generated MAC PDU. As the buffer status up to the last event that triggered the BSR2 was not contained the MAC PDU, the UE shall not cancel all pending SR(s). The example is shown in FIG. 16A.

In ProSe communication, a new sidelink BSR is introduced in order to inform the eNB of the buffer status of sidelink data. As WAN BSR and sidelink BSR are triggered by its own events, which are independent with each other, the SR could be triggered in different points in time by either WAN BSR or sidelink BSR.

As the SR triggered by sidelink BSR has not been taken into account in cancellation of all pending SR(s), there could be problematic cases of FIGS. 16B and 16C.

Regarding FIG. 16B, assume the UE transmits an SR triggered due to, e.g., ProSe, and receives an uplink grant according to which the UE performs uplink transmission 4 ms after reception of the uplink grant. If there has been no Uu BSR triggered until the MAC PDU is generated, the MAC PDU will not contain the Uu BSR at all. Then, the UE shall not cancel any pending SRs and will perform the SR procedure until Uu BSR is triggered and included in the MAC PDU.

Meanwhile, regarding FIG. 16C, assume the UE transmits an SR triggered due to, e.g., sidelink BSR1, and receives an uplink grant according to which the UE performs uplink transmission 4 ms after reception of the uplink grant. During the UE is generating a MAC PDU including sidelink BSR1, another SR is triggered by, i.e., sidelink BSR2, and the UE considers that the SR is pending. In this case, the sidelink BSR2 might not be included in the generated MAC PDU. If all pending SRs including the SR triggered by sidelink BSR2 are cancelled in this case, the UE should wait until the SR prohibit timer expires and a sidelink BSR is triggered again. Accordingly, the UE would suffer from the delayed sidelink data transmission In order to cancel the pending SR triggered by sidelink BSR in case there has been no triggered Uu BSR, a new SR cancellation mechanism is needed by taking the sidelink BSR into consideration. In addition, this mechanism should also provide a method not to delay the PC5 data transmission.

FIG. 17 is a diagram for canceling scheduling requests triggered by a sidelink buffer status report in a D2D communication system according to embodiments of the present invention.

In this invention, for a UE configured with ProSe operation, when the UE generates a MAC PDU, if the UE has no pending SR triggered by Uu BSR but has at least one pending SR triggered by sidelink BSR (or ProSe BSR), the UE checks whether the UE generates a MAC PDU including a sidelink BSR in the MAC PDU or not. If the UE generates the MAC PDU including a sidelink BSR, the UE shall perform cancellation of all pending SR(s) triggered by sidelink BSR. Else if the UE generates the MAC PDU not including a sidelink BSR, the UE shall not perform cancellation of all pending SR(s) triggered by sidelink BSR.

Additionally, when the UE generates a MAC PDU, if the UE has no pending SR triggered by Uu BSR but has at least one pending SR triggered by sidelink BSR, the UE checks whether the UE generates a MAC PDU including a sidelink BSR which contains the buffer status up to and including the last event that triggered a sidelink BSR. If the UE generates a MAC PDU including a sidelink BSR which contains the buffer status up to and including the last event that triggered a sidelink BSR, the UE shall perform cancellation of all pending SR(s) triggered by a sidelink BSR. Else if the UE generates a MAC PDU including a sidelink BSR which does not contain the buffer status up to and including the last event that triggered a sidelink BSR, the UE shall perform cancellation of all pending SR(s) triggered by a sidelink BSR.

A UE communicates with eNB over Uu interface while the UE also communicates with other UEs directly over the PC5 interface (S1701). The UE is configured with at least one Uu logical channel over which the UE transmits/receive data to/from the eNB, the UE is configured with at least one sidelink logical channel over which the UE transmits/receive data directly to/from other UE, and the UE has two buffers for data transmission, one for Uu data transmission and the other one for PC5 data transmission.

In this case, if the WAN BSR trigger condition is met, the UE can trigger WAN BSR to the eNB, and if the sidelink BSR trigger condition is met, the UE can trigger sidelink BSR, independently.

If SR trigger condition is met, the UE triggers an SR and considers it pending until the SR is cancelled. If sr-ProhibitTimer is not running, the UE transmits the SR on PUCCH and starts the sr-ProhibitTimer (S1703).

When the UE receives an uplink grant while one or more SRs are pending, wherein all of the one or more SRs are triggered by sidelink BSR (S1705), the UE generates a MAC PDU (S1707).

Preferably, the MAC PDU may or may not include WAN BSR MAC, of which the buffer status is set to the total amount of Uu data available across all logical channels of a logical channel group after all MAC PDUs for the TTI have been built. Also the MAC PDU may or may not include ProSe BSR MAC CE, of which the buffer status is set to the total amount of PC5 data available across all sidelink logical channels of a logical channel group after all MAC PDUs for the TTI have been built.

When the UE generates the MAC PDU, if the UE does not have any pending SRs triggered by Uu BSR but if the UE has at least one pending SR triggered by sidelink BSR (or at least one sidelink BSR MAC CE), the UE checks whether the UE generates the MAC PDU including a sidelink BSR (S1709).

If the UE generates the MAC PDU including a sidelink BSR MAC CE, the UE cancels all pending SR(s) triggered by sidelink BSR (S1711), and the UE stops sr-ProhibitTimer (S1713).

Else if the UE generates the MAC PDU not including a sidelink BSR MAC CE, the UE does not cancel any pending SR(s) triggered by sidelink BSR, and the UE does not stop sr-ProhibitTimer (S1715).

Alternatively, the UE checks whether the UE generates the MAC PDU including a sidelink BSR which contains the buffer status of PC5 data up to and including the last event that triggered a sidelink BSR.

If the UE generates the MAC PDU including a sidelink BSR which contains the buffer status of PC5 data up to and including the last event that triggered a sidelink BSR, the UE cancels all pending SR(s) triggered by sidelink BSR, and the UE stops sr-ProhibitTimer.

Else if the UE generates the MAC PDU not including a sidelink BSR which contains the buffer status of PC5 data up to and including the last event that triggered a sidelink BSR, the UE does not cancel any pending SR(s) triggered by ProSe BSR, and the UE does not stop sr-ProhibitTimer.

Preferably, if the MAC PDU doesn't include a sidelink BSR MAC CE, the UE does not cancel any pending SRs triggered by the sidelink BSR.

Preferably, if the MAC PDU includes a sidelink BSR MAC CE not containing buffer status up to and including a last event that triggered the sidelink BSR, the UE does not cancel any pending SRs triggered by the sidelink BSR, and the UE cancels all triggered sidelink BSRs.

Figure 18:
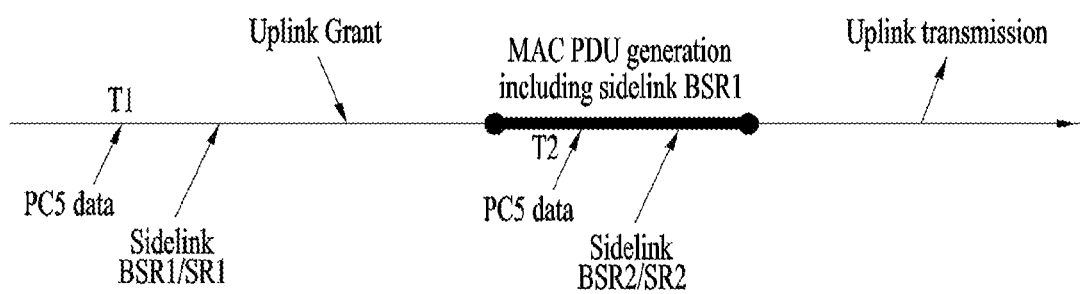
FIG. 18 is an example of canceling scheduling requests triggered by a sidelink buffer status report in a D2D communication system according to embodiments of the present invention.

FIG. 18 is an example of canceling scheduling requests triggered by a sidelink buffer status report in a D2D communication system according to embodiments of the present invention.

The UE determines the last event that triggered a sidelink BSR as follows, given that time point T1<time point T2.

If the UE triggered only one sidelink BSR1 upon PC5 data arrival at T1, the last event is PC5 data arrival at T1. If the UE triggered a sidelink BSR1 upon PC5 data arrival at T1, and the UE triggered another sidelink BSR2 upon PC5 data arrival at T2, the last event is PC5 data arrival at T2.

Example 1

PC5 data arrival at T1 triggered sidelink BSR1 and SR1. The UE receives uplink grant and generates a MAC PDU including sidelink BSR1. During the UE is generating a MAC PDU, the PC5 data arrival at T2 triggered sidelink BSR2 and SR2. When the UE generates the MAC PDU, if the UE has no pending SRs triggered by Uu BSR but the UE has pending SRs triggered by sidelink BSR, the UE checks whether the UE generates the MAC PDU including a sidelink BSR or not.

If a sidelink BSR is contained in the MAC PDU, the UE shall cancel all pending SR(s) triggered by sidelink BSR1 and sidelink BSR2. Else if no sidelink BSR is contained in the MAC PDU, the UE shall not cancel pending SR2 triggered by sidelink BSR2.

Example 2

PC5 data arrival at T1 triggered sidelink BSR1 and SR1. The UE receives uplink grant and generates a MAC PDU including sidelink BSR1. During the UE is generating a MAC PDU, the PC5 data arrival at T2 triggered sidelink BSR2 and SR2. When the UE generates the MAC PDU, if the UE has no pending SRs triggered by Uu BSR but the UE has pending SRs triggered by sidelink BSR, the UE checks whether the UE generates the MAC PDU including a sidelink BSR which contains the buffer status up to and including the last event that triggered a sidelink BSR or not.

In this example, the last event that triggered a sidelink BSR is the PC5 data arrival at T2. Therefore, if the UE generates the MAC PDU including a sidelink BSR which contains the buffer status up to and including the PC5 data arrival at T2, the UE shall cancel all pending SR(s) triggered by the sidelink BSR1 and sidelink BSR2. Else if the UE generates the MAC PDU including a sidelink BSR which does not contain the buffer status up to and including the PC5 data arrival at T2, the UE shall not cancel pending SR2 triggered by sidelink BSR2.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for a User Equipment (UE) operating in a wireless communication system, the method comprising:
   receiving an uplink grant while one or more Scheduling Requests (SRs) are pending,
   generating a Medium Access Control (MAC) Protocol Data Unit (PDU) based upon the uplink grant; and
   if all of the one or more pending SRs are triggered by a first type Buffer Status Report (BSR), and there is no pending SR triggered by a second type BSR, canceling all of the one or more pending SRs when the MAC PDU includes a first type BSR MAC Control Element (CE) including a buffer status up to and including a last event that triggered the first type BSR,
   wherein the first type BSR includes information of an amount of sidelink data available for transmission over a first type interface, and the second type BSR includes information of an amount of data available for transmission over a second type interface, and
   wherein the UE communicates with an eNB over the second type interface while the UE also communicates with other UEs directly over the first type interface.

2. The method according to claim 1, wherein if there is at least one pending SR triggered by the second type BSR, canceling all of the one or more pending SRs when the MAC PDU includes a second type BSR MAC CE including a buffer status up to and including a last event that triggered the second type BSR, but does not include the first type BSR MAC CE.

3. The method according to claim 1, further comprising:
   stopping a sr-ProhibitTimer when canceling all of the one or more pending SRs.

4. The method according to claim 1, wherein if the first type BSR MAC CE does not contain the buffer status up to and including the last BSR triggering event that triggered the first type BSR, the UE does not cancel any pending SRs, if all of the one or more pending SRs are triggered by the first type BSR, and there is no pending SR triggered by the second type BSR.

5. The method according to claim 1, wherein if the MAC PDU does not include the first type BSR MAC CE, the UE does not cancel any pending SRs, if all of the one or more pending SRs are triggered by the first type BSR, and there is no pending SR triggered by the second type BSR.

6. The method according to claim 1, further comprising:
canceling all triggered first type BSRs when canceling all pending SRs triggered by the first type BSR.

7. A User Equipment (UE) operating in a wireless communication system, the UE comprising:
a Radio Frequency (RF) module; and
a processor configured to RF module,
wherein the processor is configured to:
receive an uplink grant while one or more Scheduling Requests (SRs) are pending,
generate a Medium Access Control (MAC) Protocol Data Unit (PDU) based upon the uplink grant; and
if all of the one or more pending SRs are triggered by a first type Buffer Status Report (BSR), and there is no pending SR triggered by an second type BSR, cancel all of the one or more pending SRs when the MAC PDU includes a first type BSR MAC Control Element (CE) including a buffer status up to and including a last event that triggered the first type BSR,
wherein the first type BSR includes information of an amount of sidelink data and available for transmission over a first type interface, and the second type BSR includes information of an amount of data available for transmission over a second type interface, and
wherein the UE communicates with an eNB over the second type interface while the UE also communicates with other UEs directly over the first type interface.

8. The UE according to claim 7, wherein if there is at least one pending SR triggered by the second type BSR, canceling all of the one or more pending SRs when the MAC PDU includes a second type BSR MAC CE including a buffer status up to and including a last event that triggered the second type BSR but does not include the first type BSR MAC CE.

9. The UE according to claim 7, wherein the processor is further configured to stop a sr-ProhibitTimer, when canceling all of the one or more pending SRs.

10. The UE according to claim 7, wherein if the first type BSR MAC CE does not contain the buffer status up to and including the last event that triggered the first type BSR, the processor does not cancel any pending SRs triggered by the first type BSR, if all of the one or more pending SRs are triggered by the first type BSR, and there is no pending SR triggered by the second type BSR.

11. The UE according to claim 7, wherein if the MAC PDU does not include the first type BSR MAC CE, the processor does not cancel any pending SRs triggered by the sidelink BSR, if the all of the one or more pending SRs are triggered by the first type BSR, and there is no pending SR triggered by the second type BSR.

12. The UE according to claim 7, wherein the processor is further configured to cancel all triggered first type BSRs when canceling all pending SRs triggered by the first type BSR.

* * * * *